Jan. 14, 1936.  W. P. SCHMITTER ET AL  2,027,842
COUPLING
Filed May 29, 1933
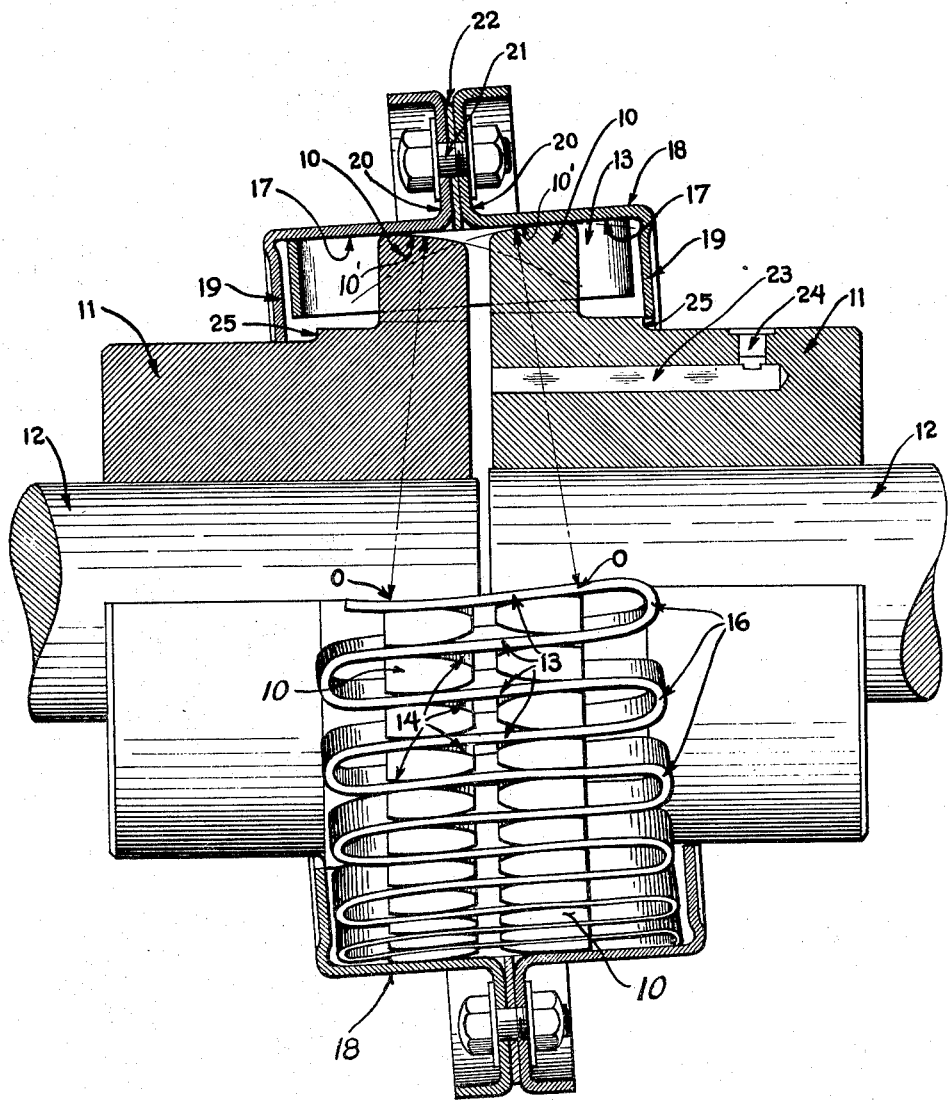
INVENTORS
Walter P. Schmitter.
BY Percy C. Day.
ATTORNEY Patented Jan. 14, 1936

2,027,842

UNITED STATES PATENT OFFICE 2,027,842

COUPLING

Walter P. Schmitter and Percy C. Day, Milwaukee, Wis., assignors to The Falk Corporation, Milwaukee, Wis., a corporation of Wisconsin Application May 29, 1933, Serial No. 673,405

5 Claims. (Cl. 64—14)

This invention relates to power transmission couplings of the torsionally resilient type, wherein the torque is transmitted from one coupling disk to the other through a circular series of parallel resilient limbs engaged in slots formed in the disks.

An important virtue of such couplings, in addition to their torsionally resilient quality, is their ability to compensate for slight misalignment between the coupled elements or shafts. Any material misalignment, however, and particularly parallel misalignment, sets up localized bending stresses in the limbs, thereby preliminarily loading the same and correspondingly reducing their torque carrying capacity. In previous designs, this undesirable condition is aggravated by a constrained condition of the limbs which in some installations causes premature wear and breakage.

One object of the present invention is to substantially eliminate the constrained condition of the torque carrying limbs in couplings of the type mentioned by a design which permits the limbs to adjust and accommodate themselves freely to conditions imposed by misalignment in such manner as to reduce to a minimum the bending and consequent preliminary loading thereof ordinarily caused by misalignment.

In the coupling hereinafter described, this is accomplished by a construction in which the several limbs are free to slide universally and uniformly within the slots of both coupling disks, but so controlled as to cause the series of limbs to tilt, as a unit, in response to misalignment, without destroying the substantially parallel relation therebetween. Couplings embodying these novel characteristics have been successfully employed in installations where prior designs have failed.

Other objects and advantages will appear, expressed or implied, from the following description of an illustrative embodiment of the present invention.

The single figure of the accompanying drawing is a sectional view of a resilient coupling, constructed in accordance with the present invention, showing the coupling disks in quarter section. The degree of parallel misalignment between the coupled shafts portrayed in this figure is somewhat exaggerated in order to facilitate illustration.

The coupling shown comprises a pair of coupling disks 10, arranged side by side, and carried by integral axially extended hubs 11 keyed or otherwise fixed to the ends of shafts 12. Either of the shafts 12 may be the driving shaft and the other the driven shaft.

A circular series of parallel limbs 13, preferably of flat spring steel, are engaged in aligned slots 14 in the peripheries of the disks 10, and together form a resilient torque transmitting medium therebetween. The rear or outer end of each slot 14 is of a width to snugly but slidably receive a limb, and the inner end of each slot is flared preferably by convexly curving the otherwise flat side walls thereof, as indicated. Each limb is free to slide longitudinally in its slots and also to tilt in a plane radial of the disks, the depth of the slots being sufficient to permit such tilting action.

Primarily for the purpose of facilitating assembly, the several limbs 13 are preferably connected by loops 16 at their ends to form a cylindrical grid-like member, which may be in one piece or in two or more sections, as preferred.

The circular series of limbs 13 bear at their outer edges against the smooth internal surface 17 of a two-part housing 18 in which the limbs are closely confined. The housing sections are provided with in-turned lubricant retainer flanges 19 at their outer edges and with out-turned flanges 20 at their adjacent inner edges for the receipt of bolts 21 or other appropriate means for releasably securing the sections together. A gasket 22 interposed between the flanges 20 provides a leak proof joint therebetween.

Lubricant is supplied to the housing 18 through one or more ducts 23 in a disk hub 11, which discharges into the gap between the disks, and which is provided with a supply port 24 fashioned to receive a lubricant gun of a well known type.

The housing 18 is seated upon and centered by the disks 10, the peripheral surfaces 10' of which are spherically curved to permit free rocking action of the housing thereon. In this instance the center of curvature 0 of each surface 10' is spaced outwardly from the inner face of each disk, as indicated, so that the housing 18 is free to tilt and thereby adjust itself to any eccentric relation between the disks caused by misalignment of the shafts.

The drawing portrays an exaggerated condition of parallel misalignment in which the disk on the right is elevated relative to the other disk, causing the housing to tilt in a counter-clockwise direction from its normal symmetrical position. This relation of the parts maintains during rotation of the shafts, disks, and housing, and the housing rotates about its central tilted axis.

When so tilted, the series of limbs 13, confined by the housing, are similarly tilted, as a unit, so that the parallel relation between the limbs is substantially preserved, the upper and lower limbs of the series being longitudinally shifted and tilted in their slots, and the intermediate limbs being tilted to compensate for the misalignment of their slots. During rotation of the shafts, each limb 13 travels, parallel to itself, with the housing and about the tilted axis of the housing, and during that travel each limb periodically tilts and reciprocates longitudinally in its slots. By reason of this peculiar action, the resilient structure, comprising the several limbs 13, is free to accommodate itself to eccentricities, resulting from shaft misalignment, without being subjected to the severe bending stresses heretofore experienced.

In the case of angular misalignment between the shafts 12, the housing 18 assumes a position such that its central plane of rotation bisects the angle between the shaft axes, so that the housing and the several limbs 13 then rotate about an axis which bisects the angle of deflection between the shaft axes, and so that the resilient structure, comprising the several limbs, accommodates itself to such misalignment without imposing severe bending stresses in the limbs.

In the coupling shown, lateral displacement of the housing 18 is limited by stop shoulders 25 formed on the hubs 12, which coact with the outer housing flanges 19 for that purpose.

It will of course be understood that, during rotation of the coupling, the lubricant supplied through the duct 23 is thrown outwardly into the housing and retained therein by centrifugal force, so that the coacting surfaces of the slots, limbs, and housing are amply lubricated at all times.

Various changes may be made in the embodiment of the invention hereinabove specifically described without departing from or sacrificing the advantages of the invention as defined in the appended claims.

We claim:

1. A resilient coupling comprising a pair of coupling disks having peripheral slots formed therein, a circular series of parallel members each slidably engaged in slots in both disks and providing a resilient torque transmitting connection between said disks, and a lubricant retainer housing surrounding said disks and tiltable relative to both of them, said members being confined by said housing and tiltable therewith as a unit to thereby effect longitudinal shifting of said members relative to both of said disks in response to misalignment between the disk axes.

2. A resilient coupling comprising a pair of coupling disks having inwardly flaring slots formed in the peripheries thereof, a circular series of flat parallel members each slidably engaged in slots in both disks and providing a resilient torque transmitting connection between the disks, and a lubricant retainer housing surrounding said disks and tiltable relative to both of them, said members being radially confined by said housing and tiltable therewith as a unit to thereby effect longitudinal shifting of said members relative to both of said disks in response to misalignment between the disk axes.

3. A resilient coupling comprising a pair of coupling disks having spherically curved peripheral surfaces and also having inwardly flaring peripheral slots formed therein, a series of parallel members of flat form each slidably engaged in slots in both disks and providing a resilient torque transmitting connection between said disks, a housing riding on said peripheral surfaces of the disks and tiltable relative to both of them, said series of members being radially confined by said housing and tiltable as a unit therewith to thereby effect longitudinal shifting of said members relative to both of said disks in response to misalignment between the disk axes.

4. A resilient coupling comprising a pair of coupling disks, a grid-like member having resilient limbs each slidably engaged in driving relation with both of said disks to provide a resilient torque transmitting connection therebetween, a housing surrounding said disks and tiltable with respect to both of them, said member being confined by said housing and tiltable as a unit therewith to thereby effect longitudinal shifting of said limbs relative to both of said disks in response to misalignment between the disk axes.

5. A resilient coupling comprising a pair of coupling disks, a circular series of parallel resilient members each slidably engaged in driving relation with both of said disks and providing a resilient torque transmitting connection therebetween, a housing surrounding said disks and tiltable relative to both of them, said series of members being radially confined by said housing and tiltable as a unit therewith to thereby effect longitudinal shifting of said limbs relative to both of said disks in response to misalignment between the disk axes.

WALTER P. SCHMITTER.
PERCY C. DAY.